Patented Aug. 21, 1934

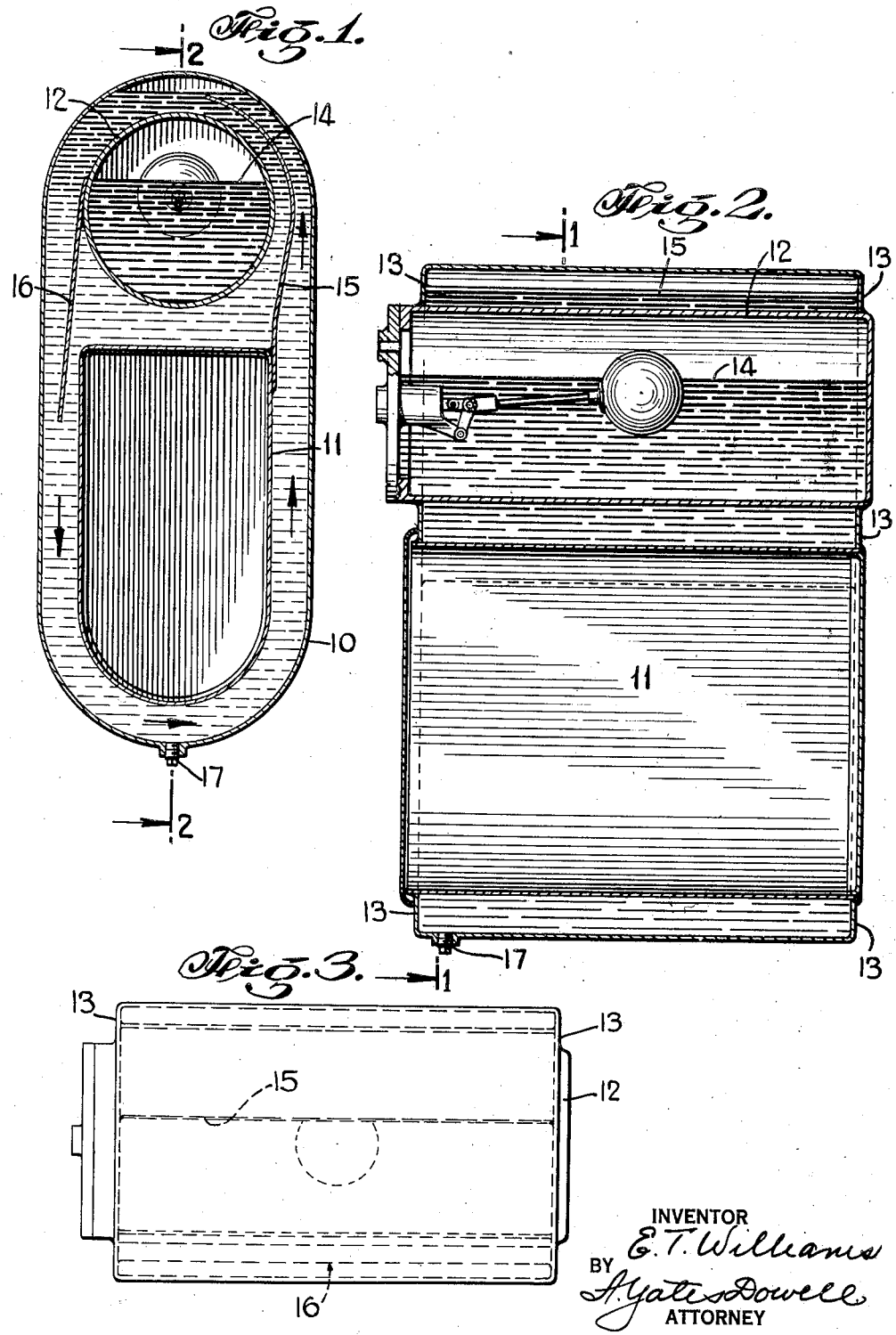

1,971,245

UNITED STATES PATENT OFFICE 1,971,245

REFRIGERATION

Edward T. Williams, Pelham Manor, N. Y.

Application August 7, 1930, Serial No. 473,554

11 Claims. (Cl. 62—95)

This invention relates to refrigeration and more particularly to a thermal brine circulating evaporator adapted to contain a supply of liquid refrigerant within the same, such supply being controlled in any desired manner as, for example, by a float valve, a freezing chamber or compartment being also provided within the evaporator.

It is an object of the invention to provide a device of this character of a construction such that a quantity of brine, or other cooling medium, contained within the outer-casing around the float chamber of the freezing compartment will be caused to circulate and insure an even distribution of the cooling effect.

In the drawing,

Fig. 1 is a vertical section through an evaporator illustrating one application of the invention, Fig. 2, a vertical longitudinal section, and Fig. 3, a top plan view.

Referring to the drawing in which like reference characters indicate similar parts throughout the several views, the device comprises an oval shaped outer-casing or shell 10. In this casing is mounted a freezing chamber or compartment which is defined by a wall 11 which is of a shape corresponding to the lower portion of the shell 10, but which is shorter than the outer shell and is provided with a relatively flat upper surface or top portion disposed a sufficient distance below the upper portion of the outer shell to permit the accommodation of a cylindrical float chamber or chilling unit 12. The ends of the device are provided with closure plates 13, which close the space between the freezing compartment, float chamber, and the outer casing so that a quantity of brine or other solution may be contained within the device above the float chamber and freezing chamber. Any well known type of float valve construction may be employed for controlling the level of the liquid refrigerant within the float chamber which level is indicated as 14 in Figure 1. The construction of this float does not constitute a part of the present invention.

Instead of using a flooded type evaporator or chilling unit any type chilling unit desired may be employed whether compression, absorption or the like.

One of the cardinal features of the present invention resides in the unique application of means for causing temperature variations in the brine chamber to produce a circulation within the device. Such result is accomplished by attaching a circulating baffle 15, having high thermal resistance, to the upper portion of the side wall of the freezing chamber 11 in a manner such that the baffle plate has a curved portion which extends between the evaporator and spaced side wall of the tank to a point near the top of the tank so that brine as it absorbs heat in its flow will be directed in a given direction. Likewise on the opposite side of the float chamber is attached a depending baffle plate 16, having low thermal resistance, which projects downwardly between the side of the freezing chamber and the wall of the tank.

On account of this construction as the brine is chilled when it comes in contact with the float chamber it will flow downwardly at the left side of the tank as shown in Figure 1 and upon being heated will travel upwardly at the opposite side of the tank positive and rapid circulation of the brine in contact with the evaporator surface is induced. The thermal conductor or baffle 16 is in fused contact with the float chamber and furnishes a path of high thermal conductivity extending into the annular space containing brine, on the downward flow side. On the opposite or upward flow side the circulating baffle guides the upward current of brine toward the outer and warmer wall until it reaches the top of the evaporator above the float chamber where it contacts with the cold evaporator surface, thereby increasing its specific gravity and thus causing it to flow downwardly on both sides of the float chamber as indicated by the arrows. This decrease of temperature with consequent further increase of specific gravity continues so long as the brine contacts with the thermal conductor plate thus greatly accelerating circulation, with resulting heat transfer.

A filling plug 17 may be provided in the bottom of the device and by the removal of such filling plug the device may be either emptied or filled.

Various modifications may be made without departing from the spirit of the invention as for example the thermal conductor plate 16 may be made longer or corrugated or modified in any desired manner to increase its surface beyond that of a flat plate.

I claim,

1. A device of the class described comprising a brine tank, a freezing chamber in said brine tank, a chilling unit in said brine tank above the freezing chamber, a depending plate on one side of the chilling unit, and an upstanding plate at the opposite side of the freezing chamber, said plates slanting slightly toward the respective wall of the brine tank to which each is nearest to thereby guide circulation of brine within the device.

2. A cooling unit comprising a brine tank, a cooling element located within said tank, a baffle plate disposed in said tank at one side of the cooling element and having greater thermal resistance than brine adapted to be contained within said tank, and a baffle plate of low thermal resistance extending downwardly on the other side of and having thermal connection with the cooling element.

3. A cooling unit comprising a brine tank, a cooling element located within said tank, a baffle plate disposed in said tank at one side of the cooling element and having greater thermal resistance than brine adapted to be contained within said tank, and a baffle plate within the brine tank at the other side of and having thermal connection with the cooling element having a lower thermal resistance than the brine, said baffle plates extending in opposite directions from their supports.

4. A cooling unit comprising a brine tank, a cooling element located within said tank, a baffle plate disposed in said tank at one side of the cooling element and having greater thermal resistance than brine adapted to be contained within said tank, and a baffle plate within the brine tank at the other side of the cooling element having a lower thermal resistance than the brine, the first baffle plate extending upwardly beside and in spaced relation to the cooling element, the second baffle plate contacting the cooling element and extending downwardly therefrom.

5. A cooling unit comprising, a brine tank, a cooling chamber in said brine tank, a cooling element in said brine tank above said cooling chamber, a baffle plate of high thermal resistance extending from one side of said cooling chamber upwardly between said cooling element and the adjacent wall of the brine tank.

6. A cooling element comprising, a brine tank, a cooling chamber in said brine tank, a cooling element in said brine tank above said cooling chamber, a baffle plate of high thermal resistance extending from one side of said cooling chamber upwardly between the cooling element and the adjacent wall of the brine tank, and a baffle plate of low thermal resistance extending from the other side of said cooling element downwardly between said cooling chamber and the adjacent wall of the brine tank.

7. A cooling unit comprising a closed vessel, a cooling element within said vessel having unbalanced heat transferring properties of a character to produce uni-directional circulation within said vessel.

8. A cooling unit comprising a closed vessel, a cooling element within said vessel having unbalanced heat transferring properties of a character to produce uni-directional circulation with said vessel and comprising an extended heat conducting surface thermally connected to the cooling element.

9. A cooling unit comprising a closed vessel, a cooling element within said vessel having unbalanced heat transferring properties of a character to produce uni-directional circulation within said vessel and comprising baffle means tending to prevent flow of a column of fluid in contact with the cooling element.

10. A cooling unit comprising a receptacle for fluid, a cooling element in said receptacle, and baffle means supported at substantially opposite sides of said cooling element extending in opposite directions from their supports for directing circulation of fluid within said receptacle one of said baffle means having a better thermal association with the cooling element than the other of said baffle means.

11. A cooling unit comprising a receptacle for fluid, a cooling element in said receptacle and baffle means supported substantially on opposite sides of said cooling element and extending in opposite directions from their supports for directing circulation of fluid within said receptacle, said baffle means being connected at one side to the cooling element and at the other side being spaced from the cooling element.

EDWARD T. WILLIAMS.